United States Patent
Duneau

(10) Patent No.: US 9,570,050 B2
(45) Date of Patent: Feb. 14, 2017

(54) SYSTEM AND METHOD FOR ENHANCED SCREEN COPY

(75) Inventor: Eric Duneau, Surbiton (GB)

(73) Assignee: ASSIMA SWITZERLAND SA, Lausanne (CH)

( * ) Notice: Subject to any disclaimer, the term of this patent is extended or adjusted under 35 U.S.C. 154(b) by 756 days.

(21) Appl. No.: 13/419,170

(22) Filed: Mar. 13, 2012

(65) Prior Publication Data

US 2013/0246039 A1    Sep. 19, 2013

(51) Int. Cl.
G09G 5/40     (2006.01)
G06T 11/60    (2006.01)
G06F 21/60    (2013.01)
G06F 17/28    (2006.01)

(52) U.S. Cl.
CPC ............ *G09G 5/40* (2013.01); *G06F 21/606* (2013.01); *G06T 11/60* (2013.01); *G06F 17/289* (2013.01); *G06F 2221/032* (2013.01); *G06F 2221/2123* (2013.01); *G09G 2340/12* (2013.01); *G09G 2358/00* (2013.01)

(58) Field of Classification Search
CPC   G06F 17/289; G06F 21/606; G06F 2221/032; G06F 2221/2123; G06T 11/60; G09G 2340/12; G09G 2358/00; G09G 5/40
See application file for complete search history.

(56) References Cited

U.S. PATENT DOCUMENTS

| | | | |
|---|---|---|---|
| 5,797,011 A * | 8/1998 | Kroll et al. | 717/137 |
| 6,023,670 A | 2/2000 | Martino | |
| 7,912,924 B1 * | 3/2011 | Cantrell | G06F 17/30569 709/219 |
| 8,087,007 B2 | 12/2011 | Duneau | |
| 8,438,004 B2 * | 5/2013 | Carter | 704/2 |
| 2006/0036739 A1 * | 2/2006 | Hagale et al. | 709/227 |
| 2007/0150500 A1 * | 6/2007 | Kawada et al. | 707/101 |
| 2007/0179775 A1 * | 8/2007 | Bauman et al. | 704/8 |
| 2008/0201656 A1 * | 8/2008 | Kim | G06F 17/30884 715/770 |

* cited by examiner

Primary Examiner — Angela A Armstrong
(74) Attorney, Agent, or Firm — Norton Rose Fulbright US LLP; Aaron Grunberger

(57) ABSTRACT

A computer implemented system and method provides for responding to an instruction to a print screen instruction by generating and storing an image of user interface components that had been displayed in a display area when the instruction was received; and storing in association with the image original text that had been displayed in the display area and on the user interface components when the instruction was received, where the first image does not include a representation of the original text. Output of the screen copy includes, for example, overlaying some or all of the text, or which some or all can be in modified form, over the image.

17 Claims, 2 Drawing Sheets

SYSTEM AND METHOD FOR ENHANCED SCREEN COPY

FIELD OF THE INVENTION

The present invention relates to a system and method for providing enhanced screen copy functionality to facilitate text modification in screen images.

BACKGROUND

Computer system users often collaborate on projects by exchanging information, e.g., over a network, such as the Internet, or using non-electronic delivery methods to exchange computer-based information. Such information often includes copies of digital information or computer image data. Such data can be saved on a user's computer and/or provided to another person, e.g., another computer user. Exchange of information can also be between different users of the same computer terminal. For example, a first user of the terminal can create or otherwise obtain data displayed on a user interface of the terminal, and second user can view such data that has been output on the user interface. Alternatively, the first user can send the data to the second user, who can then view the data by logging into the second user's account, e.g., e-mail account, to which the data has been sent.

Data a user might want to exchange with another user often is ensconced within sensitive information that is not to be exchanged. The user sharing the data therefore must strip the sensitive information prior to sharing the data.

Often exchange of data occurs between users who speak different languages. A first user speaking a first language might want to exchange data in the first language with a second user who speaks a second language, which is an inefficient way to provide the information to the second user.

Additionally, a first user might want to present a modified version of data to a second user as a prototype for an output of a program, e.g., in a collaboration for creating a computer program, for example, as described in U.S. Pat. No. 8,087,007, issued Dec. 27, 2011, the entire contents of which is hereby incorporated by reference herein.

Data of a computing device to be saved and/or shared often includes data of a graphical type, for example, graphical user interface data of a screen. Such data can be saved and transmitted as a screenshot. For example, MICROSOFT WINDOWS® provides a print screen key, in response to selection of which, for example, if selected by itself, a bitmap image of the entire screen is captured and copied to a storage area, e.g., the clipboard, and, if selected in combination with selection of the Alt key, a bitmap image of the portion of the active window of the screen that is visible in the screen is captured and copied to the storage area, e.g., the clipboard. Such bitmap data can be obtained from storage for viewing at a later time and/or transmitted or otherwise provided to other users. For example, during a teleconference, a user might want to explain a concept by using that which is on the user's screen as a visual aid. The user can use the screen copy functionality to obtain a copy of the screen, and e-mail the screen copy to the other user for discussion during the teleconference.

SUMMARY

As noted above, it is often desirable to modify data prior to its exchange with other users. Where a screen copy is obtained, however, such data is not readily modifiable.

Embodiments of the present invention provide an enhanced screen copy functionality by which a screen copy is captured in a form that is easily modifiable without having to edit pixels of the captured image, for example to remove and/or replace data within the screen copy.

Example embodiments of the present invention provide a system and method executed by the system that captures a screen copy, whose textual data is manipulable manually and/or automatically.

In an example embodiment of the present invention, the system is configured to apply a translator module to textual data within a captured screen, and replace the text within the screen with its translation. For example, the system provides an interface by which a user can select a language into which the text is to be translated. In response to such selection, the system passes the text of the screen copy through a translation module that applies the appropriate electronic dictionary of the selected language, to obtain the translated text. The system removes the text that was translated by the translation module from the screen copy and replaces the removed text with the translation text (i.e., the translation of the removed text) in the selected language. The replacement translation text is positioned in the screen copy based on the positions of the screen copy at which the replaced text had been located prior to its removal.

Alternatively, the system automatically selects a language, for example, based on the receiver. For example, user settings of the receiver to whom the screen copy is being sent can include a preferred language. Depending on such settings, in an example embodiment, the system automatically applies a translator for translating the text of the screen copy from its original language to the language indicated by the user settings.

In an example embodiment, the system obtains from the user an indication of the language of the source text initially captured in the screen copy. Alternatively, the system assumes the language as being that selected in the system preferences of the user whose screen was captured. Alternatively, the system applies an algorithm to determine the source language. For example, the system can perform methods described in U.S. Pat. No. 6,023,670, issued Feb. 8, 2000, the entire contents of which is hereby incorporated by reference herein, for determining the language of the text being replaced.

In an example embodiment of the present invention, the system is configured to provide for removal and/or replacement of data text and/or of user interface component text, e.g., text that is a part of an electronic form, e.g., a button label or the like. Data text, for example, is data of a text input field or text within a table, e.g., corresponding to records of a database. In an example embodiment, the system is configured to provide user selectable options by which a user can select which type of text, e.g., data text and/or user interface component text, is to be automatically removed and/or replaced. For example, such options can be presented in a graphical user interface of the system in the form of radio buttons, list-box, etc. The system is configured to differentiate between the different text types, e.g., data text or user interface component text, of the text in the captured screen, and modify the screen according to the user selections.

According to an example embodiment of the present invention, a processor executing an enhanced screen copy module intercepts a print screen call to an operating system, and performs a screen copy process to obtain a screen copy whose text is modifiable.

According to an example embodiment of the present invention, to construct the modifiable screen copy, the system sends a refresh instruction to one or more applications whose content is in the screen area such that it is displayable, and intercepts the applications' refresh events to obtain the text data, forward the user interface components, sans text, to the operating system for repainting, capture an image, e.g., a bitmap, of the user interface components repainted by the operating system, and store the captured bitmap along with the captured textual components. The system is configured to display the stored bitmap with the captured text or a modified version thereof overlaid on the bitmap, or to display the stored bitmap without any version of the text, e.g., depending on user preference.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g., as described above, having stored thereon instructions executable by a processor to perform one or more of the methods described herein.

An example embodiment of the present invention is directed to a method, e.g., of a hardware component or machine, of transmitting instructions executable by a processor to perform one or more of the methods described herein.

According to an example embodiment of the present invention, processors of different computing devices operate in tandem to perform methods described herein. For example, in an example embodiment, a first processor of a first terminal captures a screen copy of a screen displayed at the first terminal, the text of the screen copy being modifiable, and a second processor of a second terminal translates the text and replaces the text with the translation.

DETAILED DESCRIPTION

One or more applications can be running by an operating system, such as WINDOWS®. The WINDOWS® Desktop is one such application. User interface (UI) elements of such running applications, including, for example, graphical user interface components such as buttons, text boxes, grids, combo boxes, images, etc., and their associated text or data, can be displayed by the operating system in a display area of a screen. For example, UI components and other data of applications can be arranged in respective frames or "window" containers. A user can input a screen capture instruction for capturing a snapshot of the display area, or of a portion thereof, e.g., of any one or all such "window" display areas.

In an example embodiment of the present invention, the system and method of the present invention, responds to the screen capture instruction by obtaining a screen copy whose text is modifiable. The screen capture instruction, to which the system and method respond as described, can be input by selection of a designated hard key or combination thereof, and/or by selection of a soft key. For example, in an example embodiment, a module for capturing the text modifiable screen copy provides a graphical user interface including such a selectable soft key. Alternatively or additionally, a particular hardware key and/or combination of hardware keys can be designated for response by the module.

In an alternative example embodiment, the module for capturing and providing the enhanced text modifiable screenshot is configured to respond to the pressing of the designated print-screen key or other designated key or key combination to which the operating system, such as WINDOWS®, is also configured to respond. According to this embodiment, the module for providing the text modifiable screenshot is configured to intercept the screen-copy instruction, or otherwise additionally react to it, to responsively capture the text modifiable screenshot.

According to an example embodiment of the present invention, the system is configured to obtain a text modifiable screenshot of the entirety of the display area in response to a first type of screen copy instruction, and to obtain a text modifiable screenshot selectively of that portion of an active frame or window that is in the display area. For example, in an example embodiment, the system performs the former in response to selection of the print screen key by itself, and performs the latter in response to the simultaneous selection of the print screen and Alt keys. In an alternative example embodiment, the latter is performed in response to the simultaneous selection of the print screen and Ctrl keys. Other embodiments can use different keys or key combinations. Where the screen copy is to be taken of only the active window, the screen copy module can use calls such as GetDesktopWindow( ) or GetWindow( ) to determine which window is the active window, and therefore is to manipulated as described below.

Figure 1:
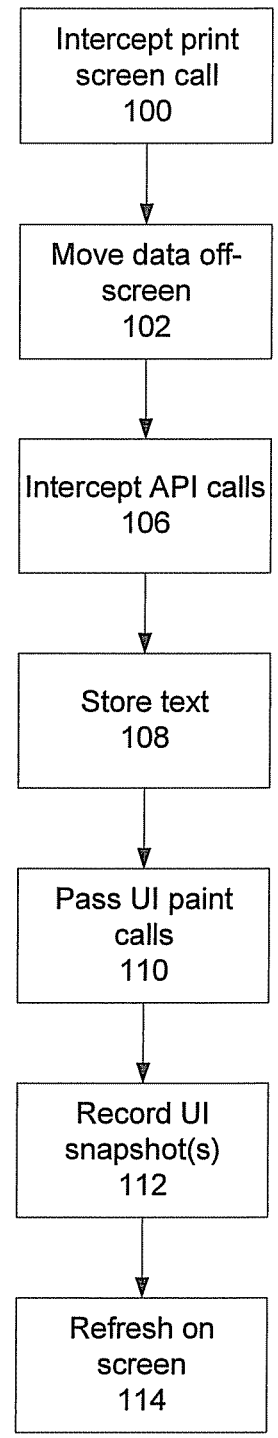
FIG. 1 is a flowchart illustrating steps for responding to an instruction to capture a screen copy, according to an example embodiment of the present invention.

FIG. 1 is a flowchart that illustrates steps for responding to a screen copy instruction to obtain a text modifiable screenshot of the display area of the graphical user interface or portion thereof at the time of the input of the screen copy instruction. The embodiment described with respect to FIG. 1 is of the scenario where the print screen key, to which the operating system is configured to respond, is selected, but its steps can be similarly applied to an embodiment in which a hard or soft key, designated for response by the module that provides the text modifiable screenshot, is selected.

Responsive to user-press of the print screen key, the processor, executing the module, intercepts, at step 100, the print screen call to the operating system. For example, the module is configured to recognize when the interrupt event for the key press of the print screen key occurs.

Depending on the nature of the key press or other user control selection, indicating whether to capture a screenshot of the entire display area or only of that portion corresponding to the active frame or window, the module either performs subsequently described steps for only the application with which the active window is associated or for all applications of which data is included in the display area.

At step 102, in an example embodiment, the module causes the displayed windows to be refreshed at an off-screen position. For example, the module can use SetWindowPos( ) to move the windows corresponding to the applications whose data is in the display area to relative off-screen positions, e.g., to the position of X=20,000+the windows' respective actual X positions; Y=20,000+the windows' respective actual Y positions, and trigger a repaint of such windows at the off-screen position. According to an alternative example embodiment, the module triggers the windows to repaint themselves in an off-screen Device Context (hDC), which would occur in memory only. In this way, subsequent processing including redisplaying the data to be captured is not noticeable to the user. For example, in a subsequent step, discussed below, user interface components are repainted without text, which repainting would occur off-screen so as not to be noticeable by the user. However, in other example embodiments, step 102 can be omitted.

As noted above, in an example embodiment different off-screen positions can be used for different windows to maintain their relative positions to each other. For example, prior to step 102, the screen copy module determines the positions of all windows in the display area, including, for example, the order of the windows, i.e., which windows overlap which other windows, and sets the off-screen positions and/or ordering accordingly. Such information can be obtained, for example, from the operating system, e.g., using GetWindow( ). In an alternative example embodiment, the screen copy module moves all of the windows to the same off-screen position, and stores the positioning and ordering information for later use to rearrange snapshots taken at a later step, so that the snapshots overlap each other according to the stored positioning and ordering information.

In an example embodiment of the present invention, the desktop elements are also similarly moved to an off-screen position for further processing as described below. In an alternative example embodiment, however, the desktop UI elements themselves are not moved off-screen even where its UI elements are to be captured, for example, in an instance where the operating system does not provide functionality for being moved off-screen. In an example embodiment, for example, where an operating system being used provides for painting of desktop UI elements to memory without painting to screen, this feature is used, i.e., the desktop UI elements is not moved off-screen, but are rather only triggered for repainting to memory.

If only the UI elements of a particular application, e.g., that of the active screen, are to be captured, then only the respective window associated with the particular application (i.e., the window representing the active screen) is refreshed off-screen. In an alternative example embodiment, for example, in an instance where an operating system being used provides functionality for painting application UI elements, for example of applications associated with windows, to memory without painting to screen, this function is used for even such application UI elements to paint to screen, and the step of moving the UI elements to an off-screen position is omitted. This can be for the case where all UI elements are to be screen-copied and/or for the case where UI elements of only the active application are to be screen-copied.

At step 102, in an example embodiment, the off screen refresh is triggered by sending a WM_PAINT message to each of the windows whose UI elements are to be captured in the screenshot. For example, where the entirety of the display area is to be captured regardless of which frame or window is active, the paint event is triggered in all windows whose UI elements are included in the display area of the display screen. For the desktop itself, in an example embodiment, the module sends a different paint message to the desktop user interface module, e.g., PaintDesktop( ). Where only the display area associated with a particular application/window, e.g., the active window, is to be captured, the paint event is triggered selectively for only that window.

In response to the trigger(s), the triggered application(s) (e.g., including the desktop where all of the display area is to be captured regardless of which window is active) send, for example, API calls to the operating system, for redisplay of the graphical user interface components and for display of the text. Such calls can include, for example, DrawText( ) TextOut( ) etc.

At step 106, the screen copy module intercepts the API calls to the operating system. At step 108, the screen copy module stores the text provided in the API calls, as well as additional information concerning the text, including, for example, the location of the text, font, color, identification of the UI element in which the text was to be displayed (e.g., label, text box, etc.). At step 110, the screen copy module passes the API calls to the operating system, without passing the text parameters or by passing empty spaces instead of the text, in response to which passed API calls the operating system repaints the user interface components at the previously indicated off-screen position (or to memory, depending on the embodiment), but without the text.

At step 112, the screen copy module takes and stores in memory a snapshot, e.g., bitmap, image of the repainted components at the off-screen position. Since the text was not provided to the operating system in step 110, the snapshot image includes only the user interface components sans text. In an example embodiment, a separate snapshot is taken for each of the applications for which a window was displayed when the screen copy instruction was obtained. The screen copy module then arranges the snapshots relative to each other according to the stored positioning and ordering information. Alternatively, the screen copy module causes the windows to be moved off-screen such that their relative off-screen positions are the same as those of their relative on-screen positions at the time the screen copy instruction was obtained, and then takes a single snapshot with all of the window overlays. Alternatively, according to the embodiment in which the repainting is to memory, such repainting can be according to current relative on-screen display positions, so that only a single screen-shot is subsequently taken.

As an alternative to taking a snapshot of the user interface components arranged by the operating system, the screen copy module itself can reconstruct the graphical user interface arrangement based on the user interface component information included with the user interface repaint calls. However, the reconstruction by the operating system is more efficient.

In an example embodiment, when the text is stored at step 108, the screen copy module also records with which user interface components the respective intercepted text was associated when being passed. Based on this information, the screen copy module determines and records for each of one or more of the recorded text components, whether the recorded text component is a user interface component text or a data text. For example, if the text is associated with an edit field, the screen copy module records the text as data text, if the text is associated with a button or tab control, the screen copy module records the text as interface/form text, etc.

However, it can occur that the screen module does not recognize a passed graphics component to know whether the text is data or user interface text. In this case, in an example embodiment, the screen copy module is configured to make a determination of whether it is user interface or data text based on image characteristics surrounding the text. For example, if the text is determined to be positioned in a section of the image formed of a white background forming an approximate rectangular shape demarcated by lines, the screen copy module records the text as data text because the image characteristics suggest an edit field.

It can occur that the algorithm causes some of the text to be mislabeled. Therefore, according to an example embodiment of the present invention, the system of the present invention provides a user interface by which the screen copy module is configured to receive user instructions to modify the identified type with which a captured text element of the screen copy is associated by the screen copy module. For example, the user can instruct the screen copy module to associate text that the screen copy module had previously determined to be "data text," with metadata identifying the text instead as "UI text."

In a example embodiment, the screen copy module also records the position, font, and size of the text as indicated by the text repaint calls. Such position information in combination with the window position information is usable for outputting a screen copy with the text properly overlaying the snapshot(s).

In an example embodiment the off-screen redraw is limited to the applications running in the desktop, but not the desktop itself. For the desktop itself, the screen copy module causes the desktop to provide operating calls for being redrawn after removal of all application windows from the screen. For example, the screen copy module causes all windows to be moved off-screen as noted above, and then causes the desktop to send the redraw commands to the operating system. The screen copy module intercepts the text redraw commands of the desktop as described above, and allows the user interface component redraw commands to be passed to the operating system. The desktop user interface components, sans text, are then redrawn without the application windows.

According to the embodiments in which the repainting is caused to be performed at an off-screen position, the repainting at the off-screen position can cause components displayed in the display screen at the time the screen copy instruction was input to now be missing from the display screen. Accordingly, in an example embodiment, at step 114, the screen-copy module triggers movement of the windows (those which have been previously moved off-screen) back to the on-screen positions and triggers repainting at the on-screen positions, so that the display returns to the state in which it was in when the screen-copy instruction was input. For this repainting, the screen copy module refrains from intercepting calls made to the operating system. The two paint events may cause a slight blinking effect.

Subsequent to the recording, by the screen-copy module, of the snapshot and text, the system and method of the present invention provide for output, e.g., display in a display screen, of such recorded components. In an example embodiment, a user can use the "paste" function, in the usual sense, for pasting the screen-copy. For example, the user can open a word-processing program and use the paste control to input an instruction to paste the screen-copy. According to an example embodiment of the present invention, the screen-copy module combines the snapshot(s) and text, e.g., using the recording position, font, and size information, to position the text properly overlaying the snapshot(s). According to an example embodiment in which separate snapshots are taken for the different windows, the screen-copy module additionally uses the window ordering and positioning information to arrange the data with the same relative positioning as that which was present when the screen-copy instruction was input.

In an alternative example embodiment of the present invention, referring again to FIG. 1, subsequent to step 114, the screen-copy module causes the operating system to perform its usual screen-copy function to store, a, e.g., bitmap, copy of the entire screen in its clipboard.

In an example embodiment of the present invention, aside from the simple paste functioning, the screen-copy module provides enhanced functionality to allow modification of the screen copy. For example, the screen-copy module provides a user interface including selectable options, via user-selection of which to input preferences regarding how to display text.

In an example embodiment, the system and method includes an option for display of the screen-copy without any text, in response to selection of which, the system and method outputs the screenshot(s) of the graphical user interface components sans text.

In an example embodiment, the system and method, e.g., additionally, includes an option for display of the screenshot(s) and only a specified type of text. For example, the user can select to display only user interface/form text (i.e., label text) and not data text. In response to selection of such an option, the system and method displays the snapshot(s) overlaid with only the selected text type.

In an example embodiment, the system and method, e.g., additionally, includes an option for display of the screenshot(s) overlaid with the original interface/form text, and with a translated version of the data text (or vice versa), in response to selection of which the system and method displays the screenshot(s) overlaid with the original version of the text that is of the type selected to be displayed in its original version, applies an electronic dictionary to translate the text selected to be translated into a selected language, and overlays the translated version of the text selected to be translated onto the snapshots according to the positioning information of the text that has been translated. In an example embodiment, the font and size selected for the translated text is selected based on the recorded font and size of the original text that the translated text replaces.

In an example embodiment, the system and method provides for translation and replacement of all text. For example the user can select to translate a particular text type or to translate all text types. For example, an "all text" translation option can be provided. Alternatively, the user can select each individual text type to be translated, all text types being selectable for a single rendering.

In an example embodiment, the user is required to input an identification of the language of the original text. In an alternative example embodiment, the system automatically identifies the language. In an alternative example embodiment, the system provides for receipt of user input identifying the source language, but, if the user refrains from inputting the identification of the source language, the system then automatically determines the language. It may be preferable to allow the user to identify the source language before performing the automatic analysis, for example, to improve processing efficiency and/or because the automatic determination can be faulty.

In an example embodiment of the present invention, the system and method initially displays the screenshot(s) with all original text overlaid, or provides the user with the option to display all of the text as noted above, and provides select and modify functionality for the user to enter changes to the text. For example, the user can select text within the displayed modifiable screen-copy and manually edit such text similar to the manner in which the user would modify text using a word processor, e.g., including deletion of selected text and/or input of different text. For example, all of the text types, including label text and data text, can be selectable and modifiable. In an example embodiment, the system and method provides the user the option to select text and select a translation option to apply to the selected text, the translation being performed as described above.

In an example embodiment, the system and method provides a "find and replace" function by which to modify the text. For example, the user can use this function to cause the processor executing the screen copy module to replace one or more, e.g., all, occurrences of "Sarah" with "Louise" or credit card number "0456 9983 7502 0912 34" with "0123 4567 8901 2345 67," etc. This can be particularly useful, for example, to allow a user to share a screen shot with sensitive text being replaced by other generic text. In an example embodiment, the system provides an interface by which the user can create a custom dictionary of source terms and replacement terms to apply to text (all or selected parts) of the captured screen copy. The screen copy module would accordingly replace each occurrence of a source term of the custom dictionary with the respective replacement terms.

In an example embodiment of the present invention, the system and method includes a modified translation option, in response to selection of which the system and method sets a property of the text such that the text is to be translatable depending on the recipient. For example, if the screen-copy is opened by a recipient whose settings associate the recipient with a particular language, the screen-copy is translated for the recipient into that language. Thus, different recipients view the text in different languages. According to an example embodiment, to implements such functionality, code is transmitted along with the screen-copy to cause the processor of the recipient's machine to apply the translation. Alternatively, the translation functionality is applied only where the recipient has required programming for interpreting metadata indicating the selected translation option. For recipients who do not have the necessary programming, the screen copy can be opened with the original text, without the translation being applied. The recipient-specific translation option can, according to an example embodiment of the present invention, also be provided with further selectable options to select the text type for which the translation is to be performed and/or can be provided for application to user-selected text. For example, the user can select text and then select an option to apply metadata indicating that the selected text is to be translated on the recipient-specific basis. According to an example embodiment, where the translation is to be performed on a recipient specific basis, if recipient settings do not associate a particular recipient with a particular language, the text is provided in the original language for such recipient.

In an example embodiment of the present invention, a user can set settings such that only data type text is modified for the recipient, while user interface type text remains in original form. This may be particularly useful where the text modification is to refrain from disseminating confidential information, e.g., customer data, financial data, etc. For example, the text modification may be performed even where the modified text is in the same language as the source text, but is nevertheless provided instead of the source text to protect the confidentiality of the source text. However, user interface type text usually is not confidential and therefore need not be changed. In an example embodiment, whether the user interface data is modified can depend on whether the recipient's language is different than that of the language of the user interface text, and whether the data type text is modified can depend on whether the recipient is identified as belonging to a group permitted to access the data type text and/or on whether the recipient's language is different than that of the source data type text. Stated otherwise, different conditions can be applied to data type text and user interface type text for the system to determine whether to modify the text for the recipient.

In an example embodiment of the present invention, the system and method further provide the user, in response to whose instruction the screen-copy was performed, with the option to lock settings of the screen copy such that a recipient cannot modify the screen copy sent by the user. For example, the first user can set options as described above to generate the user-preferred screen copy, whether or not it is recipient-specific, and once opened by the recipient, the recipient is prevented from modifying the text.

According to an example embodiment of the present invention, the screen copy module can hook into other applications, e.g., a word processor application, such as MICROSOFT® Word, to provide the above-described options for paste of the screen-copy in such application. For example, the screen copy module can add a tool bar with the above-described options for use in such other application. Alternatively, if the user selects to paste into an interface not specific to the screen copy module, the screen copy module generates the screenshot with text overlay to correspond to the display area as it was when the screen copy instruction was received, and provides the above indicated text modification options when an interface module dedicated for the screen copy modification options is used. Alternatively, the screen copy module records a bitmap of the original screenshot(s) or has the operating system record a bitmap of the original screen (as mentioned above) to separately store in the clipboard, which the modifiable screen copy data is stored at a separate location, such that when the paste function is used in the interface not specific to the screen copy module, the bitmap data of the clipboard is used, but, when the paste function is used in the dedicated interface module, the screen copy module provides the above indicated text modification options.

In an example embodiment of the present invention, the modifiable screen copy can be stored as a file in memory for later access and manipulation.

In an example embodiment of the present invention, when capturing the screen information, e.g., using one or more, e.g., all, of the steps described with respect to FIG. 1, the screen copy module further automatically scrolls each of the windows and/or UI elements themselves (e.g., grids, treeviews, text boxes, ets.) whose content is to be captured, and triggers the repainting for different scrolled portions of the display area. The system and method can then provide the user a number of screenshots, e.g., modifiable screenshots, for different display areas of the target windows.

Figure 2:
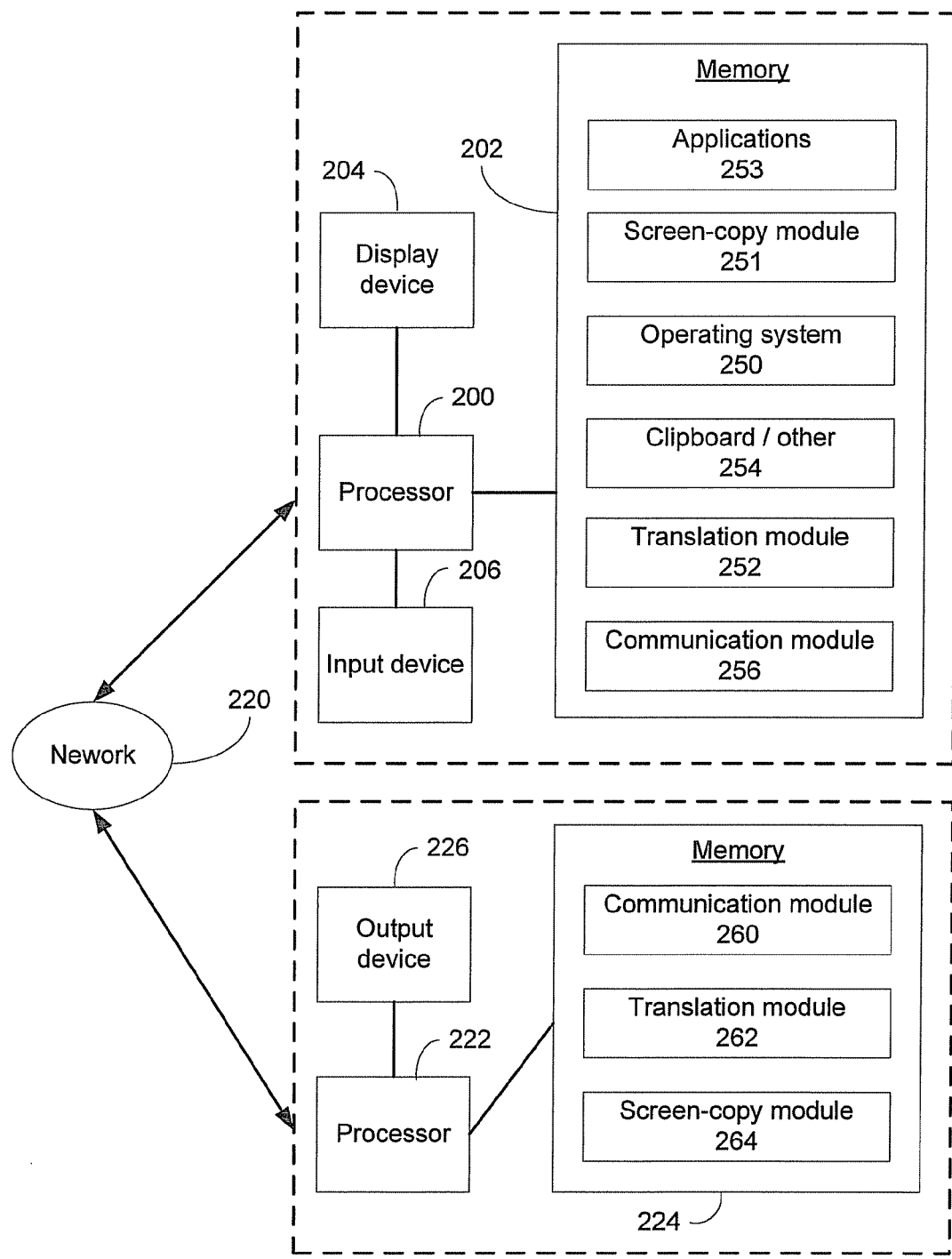
FIG. 2 is a diagram illustrating components of a system, according to an example embodiment of the present invention.

FIG. 2 is a diagram that illustrates aspects of a system according to an example embodiment of the present invention. The example embodiment includes a first terminal including a processor 200, a memory device 202, a display device 204, and an input device 206. In the example embodiment, stored on the memory device 202 are an operating system 250, a screen-copy module 251, a translation module 252 (or other text anonymization module), other applications 253, a communication module 256, and a clipboard and/or other data/file storage area 254. The applications 253 can include a graphical user interface module of the operating system 250 for display of the desktop in the display device 204. Applications 253 running on the operating system 250 provide data for output, e.g., in windows or frames, on the display device 204.

The processor 200 is configured to execute instructions of the operating system 250, screen-copy module 251, and applications 253, and accordingly control the display device 204 to generate displays. The processor 200 is also configured to store data in, and retrieve data from, the clipboard and/or other data/file storage area 254. The processor 200 is also configured to obtain user instructions by user operation of the input device 206.

A user can operate the input device 206 to input an instruction for obtaining a screen copy. The screen-copy module 251, executed by the processor 200, handles the instruction by triggering the applications 253 to refresh, e.g., off-screen. The applications 253 send calls to the operating system 250 for repainting. The screen-copy module 251 intercepts the text repainting calls, and stores the text and/or associated data, such as position, font, and size, in the clipboard and/or other data/file storage area 254. The screen-copy module 251 passes the user interface repainting calls to the operating system 250.

The operating system 250 repaints the user interface components to recreate the display area of the display device 204 sans text. In an example embodiment, the redisplay occurs at an off-screen position. In an alternative example embodiment, the redisplay occurs in a different Display Context than the screen. The screen-copy module 251 obtains a snapshot, e.g., a bitmap, of the redisplayed user interface components. A single snapshot can be taken of the entire recreated display area as a whole, including user interface components of a plurality of the applications 253. Alternatively, respective snapshots can be taken for the user interface components of respective ones of the applications 253, as described above. In an example embodiment, only a snapshot corresponding to one of the running applications for which data is displayed in the display device 204 at the time of receipt of the screen copy instruction is obtained, e.g., where the instruction is to obtain a screen copy for only the active window. The screen-copy module stores the screenshot(s) in the clipboard and/or other data/file storage area 254.

In an example embodiment, the screen-copy module 251 is configured to output a screen copy by overlaying all or selected portions of the stored text and/or modified versions of all or selected portions of the text, over the snapshot(s), e.g., according to the information concerning position, font, and size of the captured text.

In an example embodiment, the screen-copy module 251 can be operated to implement the translation module 252 to translate, or otherwise modify, all or selected parts of the text captured and stored by the screen-copy module 251, for the modification of the text.

The screen-copy module is configured to output the screen copy on an output device, e.g., the display device 204, store the screen copy (e.g., including modified text) in the clipboard and/or other data/file storage area 254, and/or provide the screen copy for transmission, using the communication module 256, to a second terminal (or to a user account, e.g., an e-mail account, which can be accessed at the same terminal as that in which the screen copy was taken or at the second terminal). Where the text is modified, the modified screen-copy can be transmitted. In an example embodiment, the screen-copy module 251 can additionally or alternatively send the user interface and text components to the second terminal (or user account), for the generation and output of the modified screen copy by the second terminal (or user account). For example, the screen-copy module 251 can send the data along with instructions on how to process and/or overlay the data. For example the user who had input the screen copy instruction can input preferences on how the data should be presented, depending on the recipient. Alternatively, the screen-copy module 251 sends the data, and the receiving terminal (and/or user account) operates its own version of the screen-copy module or portion thereof to apply user preferences/instructions of the user of the receiving terminal/user account to customizably combine the screen copy components. For example, the sending user can allow the receiving user to control how the screen copy is to be modified. For example, the receiving user cause translation of the text to a language of the receiving user's choosing.

Thus, the data can be sent over a network 220 to a second terminal, which can include a processor 222, a memory device 224, and an output device 226. In the example embodiment, stored on the memory device 224 are a communication module 260, a translation module 262, and a screen-copy module 264, which can mirror the screen copy module 251 or can be a different version thereof. The processor 222 is configured to access the memory 224 for execution of the instructions of the modules 260, 262, and 264, and to accordingly provide output to the output device 226, which can include, for example, a display device.

The communication module 260 is configured to receive the data sent by the first terminal. The screen-copy module 264 is configured to generate a screen copy using the user interface and text information obtained from the first terminal, and/or instructions obtained from the first terminal, and/or local instructions, e.g., user preferences of the user of the second terminal. The generation of the screen copy can include implementing the translation module 262.

Alternatively, the first terminal generates the modified screen copy, and transmits the modified screen copy to the second terminal for output by the second terminal, e.g., without modification by the second terminal. In an example embodiment, the first terminal is further configured to provide the modified screen copy in a locked state to block modification, e.g., by interaction with the text components, at the second terminal. For example, in an example embodiment, the first terminal generates an image, e.g., a bitmap, of the modified screen copy and transmits the image of the modified screen copy to the second terminal, which can open the image using any suitably appropriate image rendering module, such that the screen-copy module 264 and the translation module 262 are not used for the output at the second terminal.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method comprising:
responsive to a user-input instruction to capture a screen copy of a screen display currently displayed in a display area:
generating and storing, by a computer processor, a first image of user interface components that had been displayed in the display area when the instruction was received; and
storing, by the processor and in association with the first image, original text that had been displayed in the display area and on the user interface components when the instruction was received;
wherein:
the first image does not include a representation of the original text; and
the generating and storing of the first image and the storing of the original text includes:
the processor separately, via two different actions, (a) capturing, in a first of the two different actions, the user interface components without any of the original text, and (b) capturing, in a second one of the two different actions, the original text;
storing, by the processor, the first image of the captured user interface components; and
storing, by the processor, the captured original text in association with the first image.

2. The method of claim 1, further comprising:
modifying the original text;
overlaying the modified text over the first image; and
outputting the first image with the overlaid modified text.

3. The method of claim 2, wherein the modifying the text includes translating at least a portion of the original text from a first language to a second language.

4. The method of claim 2, wherein the modifying the text includes replacing at least a portion of the original text with replacement text.

5. The method of claim 2, further comprising:
storing for each of a plurality of text components of the original text respective metadata describing a format of the text component;
wherein a format of the modified text is selected based on the metadata.

6. The method of claim 2, further comprising:
storing for each of a plurality of text components of the original text respective metadata describing a format of the text component;
wherein:
a format of the modified text is selected based on the metadata; and
the metadata includes an identification of a font type, a font size, and a position.

7. The method of claim 6, wherein the metadata further includes a font style and a color.

8. The method of claim 2, further comprising:
responsive to the instruction, storing metadata describing a first portion of the original text as a first text type and storing metadata describing a second portion of the original text as a second text type;
wherein the modifying is performed in accordance with the stored metadata, to selectively modify only the original text described as a selected one of the first and second text types.

9. The method of claim 8, further comprising:
for each of a plurality of text components of the original text, determining with which of the first and second text types the respective text component is to be identified based on a respective user interface component with which the respective text component is associated, wherein the metadata is stored in accordance with the determination.

10. The method of claim 1, further comprising:
modifying at least a portion of the original text;
overlaying the modified text over the first image;
generating a second image of the first image with the overlaid modified text; and
outputting the second image.

11. The method of claim 1, wherein the storing of the first image is to a clipboard storage location from which the processor is configured to, in response to a subsequently received paste user instruction, obtain the first image for display.

12. The method of claim 1, wherein the generating and storing of the first image includes separately generating copies of respective ones of the plurality of user interface components, arranging the generated copies in an arrangement, and recording an image of the copies of the user interface components in the arrangement.

13. A computer-implemented method, comprising:
responsive to an instruction to capture a screen copy:
generating and storing, by a computer processor, a first image of user interface components that had been displayed in a display area when the instruction was received; and
storing, by the processor and in association with the first image, original text that had been displayed in the display area and on the user interface components when the instruction was received;
wherein:
the first image does not include a representation of the original text;
the storing of the original text includes:
intercepting text paint calls to an operating system; and
storing text of the text paint calls, the intercepted text paint calls not being passed on to the operating system; and
the generating the first image includes:
generating by the operating system a graphical user interface based on user interface component paint calls; and
capturing an image of the generated graphical user interface.

14. The method of claim 13, wherein the graphical user interface is generated at an off-screen position.

15. The method of claim 14, further comprising:
responsive to the instruction, and subsequent to the generating of the first image and the storing of the original text, refreshing a display of the user interface components and the original text in the display area.

16. A non-transitory computer-readable medium having stored thereon instructions executable by a processor, the instructions which, when executed by the processor, cause the processor to perform a method, the method comprising:
responsive to a user-input instruction to capture a screen copy of a screen display currently displayed in a display area:
generating and storing a first image of user interface components that had been displayed in the display area when the instruction was received; and storing in association with the first image original text that had been displayed in the display area and on the user interface components when the instruction was received;

wherein:
the first image does not include a representation of the original text; and
the generating and storing of the first image and the storing of the original text includes:
the processor separately, via two different actions, (a) capturing, in a first of the two different actions, the user interface components without any of the original text, and (b) capturing, in a second one of the two different actions, the original text;
storing the first image of the captured user interface components; and
storing the captured original text in association with the first image.

17. A computer system comprising:

a computer processor configured to perform the following responsive to a user-input instruction to capture a screen copy of a screen display currently displayed in a display area:

generate and store a first image of user interface components that had been displayed in the display area when the instruction was received; and
store in association with the first image original text that had been displayed in the display area and on the user interface components when the instruction was received;

wherein:
the first image does not include a representation of the original text; and
the generating and storing of the first image and the storing of the original text includes:
the processor separately, via two different actions, (a) capturing, in a first of the two different actions, the user interface components without any of the original text, and (b) capturing, in a second one of the two different actions, the original text;
storing the first image of the captured user interface components; and
storing the captured original text in association with the first image.

* * * * *